United States Patent [19]

Otto et al.

[11] Patent Number: 5,676,342
[45] Date of Patent: Oct. 14, 1997

[54] PROPORTIONAL FLOW VALVE WITH DIAPHRAGM PRESSURE MEMBER

[75] Inventors: Noel Otto, Whippany; Peter A. Holborow, Califon; Scott Schipper, Denville, all of N.J.

[73] Assignee: Automatic Switch Company, Florham Park, N.J.

[21] Appl. No.: 664,526

[22] Filed: Jun. 17, 1996

[51] Int. Cl.⁶ ............................................. F16K 31/06
[52] U.S. Cl. ............................................. 251/38; 251/30.02
[58] Field of Search .................................. 251/38, 30.03, 251/30.04, 129.08, 30.02

[56] References Cited

U.S. PATENT DOCUMENTS

| | | | |
|---|---|---|---|
| 4,174,824 | 11/1979 | Kolze | 251/38 X |
| 4,502,661 | 3/1985 | Swanson | 251/38 X |
| 4,880,205 | 11/1989 | Ellison | 251/30.02 |
| 4,947,887 | 8/1990 | Fox | 251/30.02 X |
| 5,294,089 | 3/1994 | LaMarca | 251/30.02 |

Primary Examiner—Kevin Lee
Attorney, Agent, or Firm—Levine & Mandelbaum

[57] ABSTRACT

A proportional flow valve wherein inlet fluid pressure urges a main valve unit having a main valve member and a surrounding diaphragm toward the valve seat. The diaphragm is connected to the valve body and has a bleed passageway to enable inlet fluid to pass from an inlet port below the main valve unit to a reservoir above it. The area of the main valve unit exposed to the reservoir is substantially greater than the area of the main valve unit exposed to the inlet port. A solenoid actuator determines the position of a pilot valve sealing member which controls the flow of inlet fluid from the reservoir through a pilot opening in the main valve member to an outlet port to selectively relieve the pressure above the main valve unit thereby permitting the main valve unit to move away from the main valve seat.

7 Claims, 4 Drawing Sheets

PROPORTIONAL FLOW VALVE WITH DIAPHRAGM PRESSURE MEMBER

BACKGROUND OF THE INVENTION

This invention relates to a valve operated by an electrical solenoid actuator, and more particularly to a proportional flow valve of this type.

Such a valve is shown in U.S. Pat. No. 5,294,089. This valve permits a rate of fluid flow through the valve proportional to the amount of electric current flowing through the coil of the solenoid actuator controlling the valve. In this type of arrangement, the actuator behaves in a linear matter, i.e., the force produced by the solenoid armature is linearly proportional to the current applied to the solenoid. As a result, the solenoid armature works in a linear manner against the closing spring which constantly urges the valve member toward the valve seat. In this way, the distance which the valve member is moved away from the valve seat is proportional to the amount of current applied to the solenoid.

Proportional flow valves find utility in performing mixing and measurement functions. For example, proportional flow valves are used to accurately blend different gasolines to achieve desired characteristics, such as particular octane ratings, and to mix hot and cold water to obtain a desired temperature. Also, a proportional valve may be used when it is desired to have a valve open gradually so that the flow of the controlled fluid begins slowly, after which the valve may be fully opened.

Typically, the power applied to the solenoid actuator is a periodically pulsed DC current, the amount of current varying with the length of "on" and "off" times of the pulses (sometimes referred to as pulse width modulation).

The valve of the above mentioned U.S. Pat. No. 5,294,089 has been found to admirably perform its function. However this prior art valve requires the use of a rigid pressure member of piston-like construction which must be fitting into a cylinder in which it is reciprocable with the main valve member. Since dimensional tolerances for the piston and cylinder must be carefully maintained, this type of construction adds to the cost and weight of the valve. The costs of these parts also adds to the cost of inventorying valves and replacement parts for them.

SUMMARY OF THE INVENTION

The valve of the present invention employs a main valve unit which includes a flexible diaphragm connected to the valve body and to a movable main valve unit. A bleed passageway between the regions above and below the diaphragm permits fluid entering the inlet port to occupy both regions. When the region above the diaphragm is pressurized by fluid from the inlet port of the valve it opposes the force of the inlet fluid pressure in the region below the diaphragm. The area of the main valve unit exposed to the region above the diaphragm has a larger effective area than the area of the main valve unit exposed to the region below the diaphragm, so that when the main valve unit is subjected to inlet fluid pressure, the main valve unit is urged toward the main valve seat to keep the valve closed. When the region above the main valve unit is open to the outlet port, the fluid in that region is permitted to escape faster than the bleed passageway can supply fluid, and the resulting pressure decrease in the region above the main valve unit causes a net force urging the main valve unit to move away from the main valve seat to open the valve, and keep it open.

A pilot valve includes a pilot valve sealing member carried by the solenoid armature and a pilot valve seat fixed to and moveable with the main valve unit. The pilot valve controls the flow of inlet fluid pressure in the region above the main valve unit to the outlet port. As a result, the position of the armature indirectly controls the position of the main valve unit by controlling the flow of inlet fluid pressure to the outlet port. The bleed passageway continuously bleeds pressurized fluid from the inlet port to the reservoir above the main valve unit so as to keep the main valve unit sensitive to the control of inlet fluid pressure by the pilot valve.

Unlike the invention of U.S. Pat. No. 5,294,089 which requires a piston pressure member suspended from the main valve member and reciprocable in a closely fitted cylinder, the present invention utilizes a main valve unit having an inexpensive annular diaphragm mounted between its main valve member and the valve housing as a pressure member to counterbalance the force of the inlet fluid pressure on the main valve member.

It is therefore an object of the invention to provide a proportional flow valve having all of the advantages offered by the valve of U.S. Pat. No. 5,294,089 but which comprises fewer parts.

Another object of the invention is to provide a proportional flow valve having all of the advantages offered by the valve of U.S. Pat. No. 5,294,089 but with reduced dimensional criticality.

A further object of the invention is to provide a valve of the type described above which operates reliably throughout all fluid pressure ranges.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
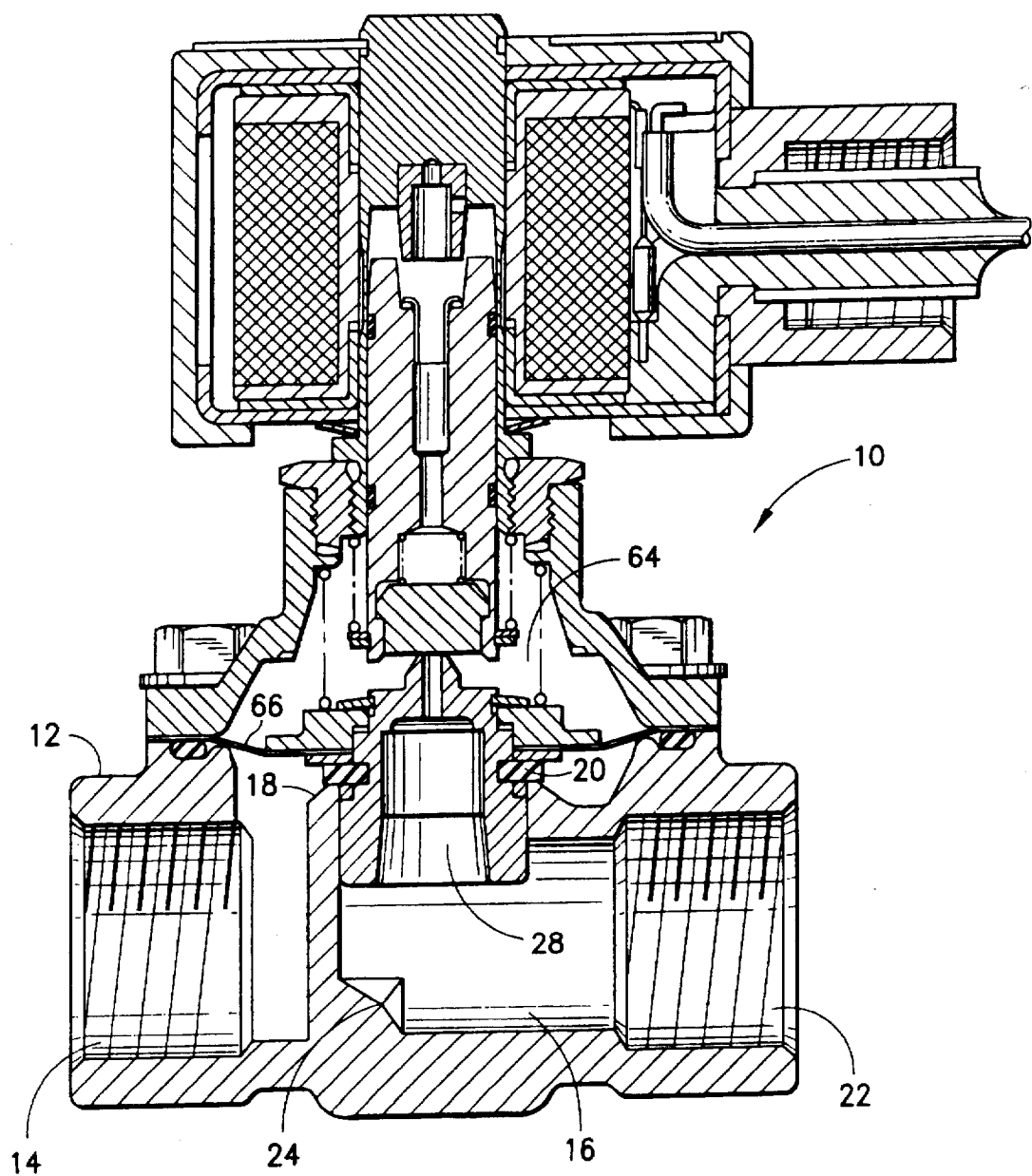
FIG. 1 is a cross sectional view of a proportional flow valve in accordance with the preferred embodiment of the invention, the solenoid actuator being deenergized and the valve closed.

Referring to the drawings, a proportional flow valve 10 chosen to illustrate the present invention includes a valve body 12 having a fluid inlet port 14, a fluid outlet port 16, and main valve seat 18 surrounding a main orifice 20. The outlet port 16 resides within a hollow elbow having a right angular bend 24 which joins a horizontal section 22 and an a vertical section 28, the latter terminating at the main valve seat 18.

A main valve unit 30 includes a main valve member 32 slidably mounted within vertical section 28 of outlet port 16 for reciprocal axial movement. The main valve member 32 has a generally circular cross section and axially extending circumferentially spaced parallel vanes 34, two of which can be seen in the drawings. The outer circumference of the main valve member 32 is profiled to accept an upper diaphragm support washer 36 having a planar lower annular surface and a diaphragm retaining ring 38 having a planar upper annular surface. Sandwiched between the lower annular surface of upper diaphragm support washer 36 and upper annular surface of diaphragm retaining ring 38 for movement with the main valve member 32 is the central area of an annular flexible diaphragm 17 which serves as a pressure member for the valve 10.

A bonnet plate 40 is secured to the top of the valve body 12 by suitable fasteners 42. Disposed between the bonnet plate 40 and a raised circumferential ridge 44 on the top of the valve body 12 is the outer circumference of diaphragm 17 which is fixedly held on its top side by the bonnet plate 40, and on its bottom side by the raised circumferential ridge 44 of the valve body 12 and a seal 46 inside and concentric with the ridge 44. Seal 46 cushions the underside of the diaphragm 17 and prevents leakage of fluid at the interfaces between the bonnet plate 40, valve body 12, and diaphragm 17.

An annular retaining clip 48 captured in a groove circumscribing the main valve member 32 urges the upper diaphragm support washer 36 toward the central region of diaphragm 17 to secure diaphragm 17 against diaphragm retaining ring 38. The vanes 34 are notched to received an annular main valve seal 50 below retaining ring 38. Main valve seal 50 is preferably fabricated from an elastomeric material.

The main valve unit 30 includes main valve member 32, upper diaphragm support washer 36, diaphragm retaining ring 38, diaphragm 17, retaining clip 48, and main valve seal 50, all of which move toward and away from the main valve seat 18 as a unit. During such movement, an intermediate annular portion 54 of diaphragm 17 is free to flex and stretch while the periphery of diaphragm 17 is held fixedly in place. Axial movement of the main valve unit 30 takes place with the vanes 34 of main valve member 32 guided within a vertical cylindrical wall of the outlet port 16 leading from the main valve seat 18.

Within the main valve member 32, running along its central axis, is a pilot passageway in the form of a circular bore 56 surrounded at its upper end by a pilot valve seat 58 and opening at its lower end into the outlet port 16. The pilot passageway 56 is selectively opened and closed by a pilot valve sealing member 68.

A main valve spring 60 is compressed between a shoulder 62 formed with the bonnet plate 40 and the top surface of the upper diaphragm support washer 36 thereby urging the main valve unit 30 downwardly into engagement with the main valve seat 18.

The fluid inlet port 14 is bounded by the underside of the main valve unit 30 (including diaphragm 17) and the exterior surface of vertical section 28 of outlet port 16. A reservoir 64 occupies the open volume above the main valve unit 30.

The diaphragm 17 is impermeable to the fluid to be controlled by the proportional flow valve 10 except at a small aperture 66 in diaphragm 17 which serves as the bleed passageway for enabling fluid entering the inlet port 14 to reach the reservoir 64 above the main valve unit 30. The bleed passageway 66 has a smaller cross section than the smallest cross section of pilot passageway 56 so that fluid can flow through the pilot passageway 56 faster than through the bleed passageway 66 when the pilot passageway 56 is open.

When the pilot valve is closed, i.e., when pilot valve sealing member 68 engages pilot valve seat 58, and the main valve is closed, i.e., when main valve seal 50 engages main valve seat 18, fluid cannot flow from the fluid inlet port 14 to the fluid outlet port 16. When the pilot valve is open, i.e., when pilot valve sealing member 68 is not in engagement with pilot valve seat 58, and the main valve is closed, fluid can flow from the fluid inlet port 14 to the fluid outlet port 16 only through the bleed hole passageway 66 into the reservoir 64, and then from reservoir 64 through pilot passageway 56. When main valve seal 50 is out of engagement with main valve seat 18, fluid flow can occur through the space between the vanes 34 of main valve member 32. The exposed area of the openings between the vanes 34 increases as the main valve unit 30 rises thereby correspondingly increasing the rate of flow from the fluid inlet port 14 to the fluid outlet port 16.

Surmounting the bonnet plate 40 is a solenoid actuator 70. The solenoid actuator 70 includes a coil 72 of electrically conductive wire would around a spool 74 made of non-electrically and non-magnetically conductive material. Suitable terminals are provided for connection to a source of electric current for energizing the solenoid coil 72. A housing 76 of magnetic material, surrounds the solenoid coil 72.

A stationary armature or plugnut 78 is located within the upper portion of the spool 74. A core tube 80 extends downwardly from the plugnut 78 and through the remainder of the spool 74. Surrounding the lower portion of the core tube 80 is a collar 82 which is, in turn, fastened to the upper portion of the bonnet plate 40. Fastening between the core tube 80 and collar 82, and between the collar 82 and bonnet plate 40 can be by press fit, welding, crimping, threading or in any other conventional manner of forming a sturdy and fluid tight connection as will be known to those skilled in the art.

Slidably axially disposed within the core tube 80 is a movable armature 84 of magnetic material. Mounted on the movable armature 84 near its lower end is a circumferential flange 86. A pilot valve spring 88 surrounding the movable armature 84 is compressed between circumferential flange 86 and the bottom surface of collar 82 and urges the movable armature 84 downwardly away from plugnut 78. The upper face of the movable armature 84 and lower face of the plugnut 78 are correspondingly profiled so that the two faces mesh as the movable armature 84 moves toward the plugnut 78. At its lower end, the movable armature 84 carries the pilot valve sealing member 68 formed of resilient material.

Figure 2:
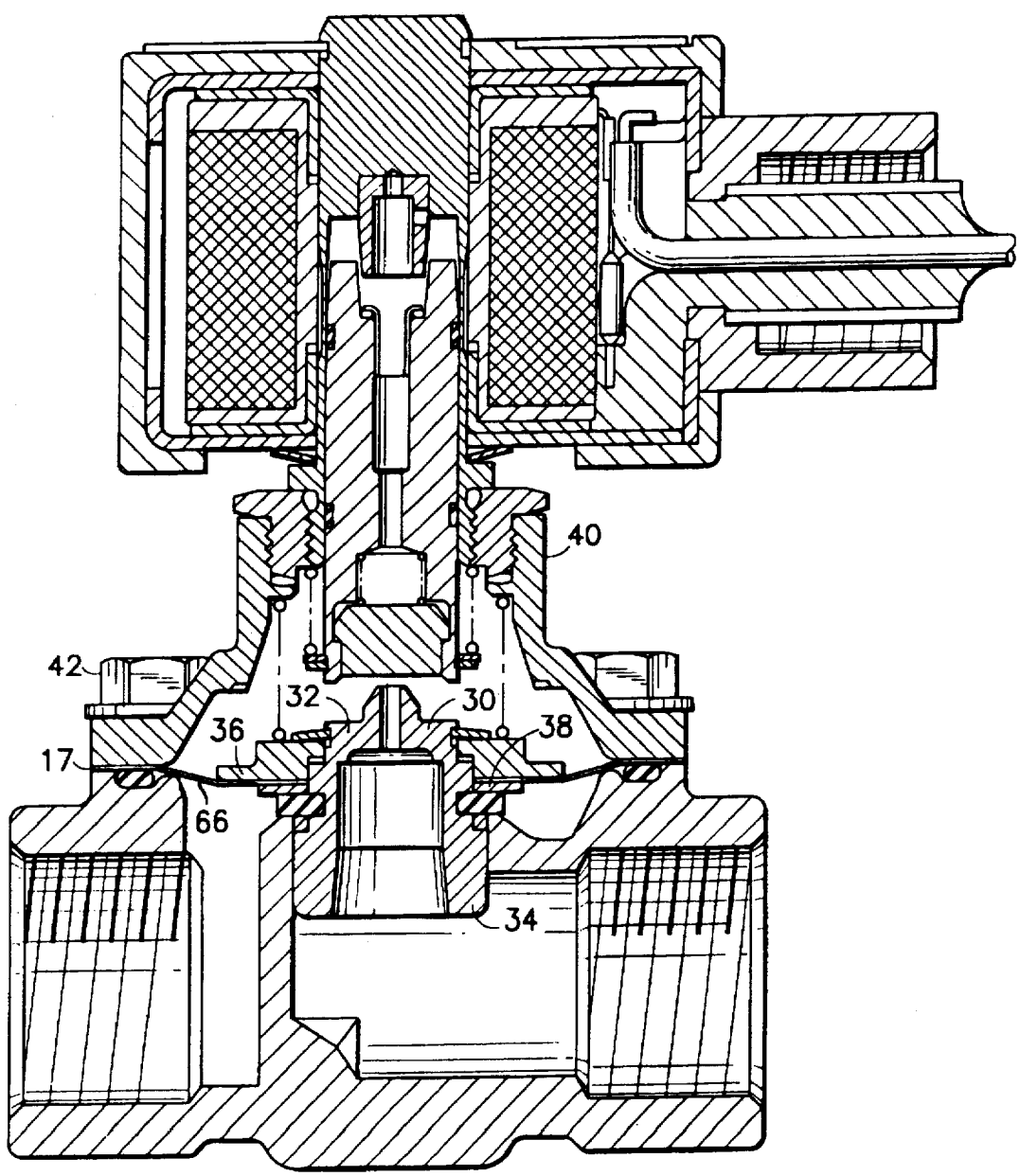
FIG. 2 is a view similar to FIG. 1, showing the solenoid energized and pilot valve open, but just prior to opening the main valve.
Figure 3:
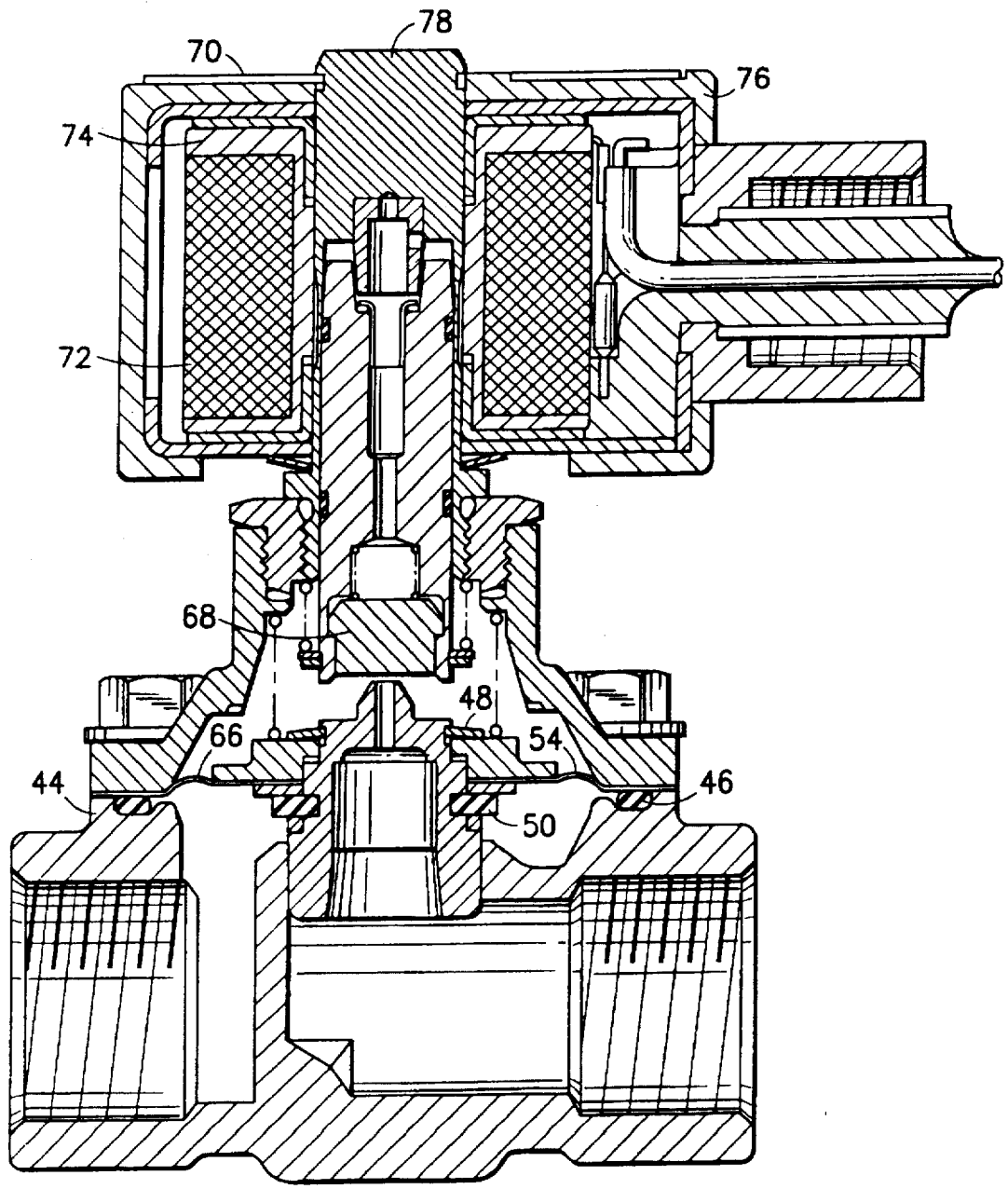
FIG. 3 is a view similar to FIG. 1, showing the solenoid energized and pilot valve open, the main valve partially open.

When solenoid coil 72 is deenergized (FIG. 1) and the fluid inlet port 14 of proportional flow valve 10 is connected to a source of pressurized fluid, e.g. a gasoline pump, the fluid is forced through the bleed hole 66 in the diaphragm 17 into the reservoir 64 above the main valve unit 30. The area of the top of the main valve unit 30 exposed to the fluid is greater than the area of the bottom of the main valve unit 30 exposed to the fluid. Hence, the force of the fluid on the top of main valve unit 30, combined with the force of the spring 60, holds main valve seal 50 against main valve seat 18 to close the proportional flow valve 10. When solenoid coil 72 is first energized by an electric current (FIG. 2), movable armature 84 is attracted to plugnut 78, and hence begins to move upwardly against the force of spring 88. As movable armature 84 rises, it moves pilot valve sealing member 68 away from pilot valve seat 58, thereby permitting inlet fluid to flow through passageway 56 into outlet port 16 which is at the lower outlet pressure. Because the diameter of the pilot passageway 56 is greater than the diameter of the bleed hole 66 in the diaphragm 17, the pressure above the main valve unit 30 and diaphragm 17 begins to decrease. As the upward force of the fluid inlet pressure on the main valve unit 30 begins to exceed the downward force of the fluid pressure on the main valve unit 30, the main valve unit 30 begins to rise (FIG. 3) and main valve unit 30 moves away from main valve seat 18. Main valve seal 50 disengages main valve seat 18 and communication between fluid inlet port 14 and fluid outlet port 16 through the spaces between vanes 34 of main valve member 32 is enabled, thereby permitting fluid flow from inlet port 14 to outlet port 16.

Figure 4:
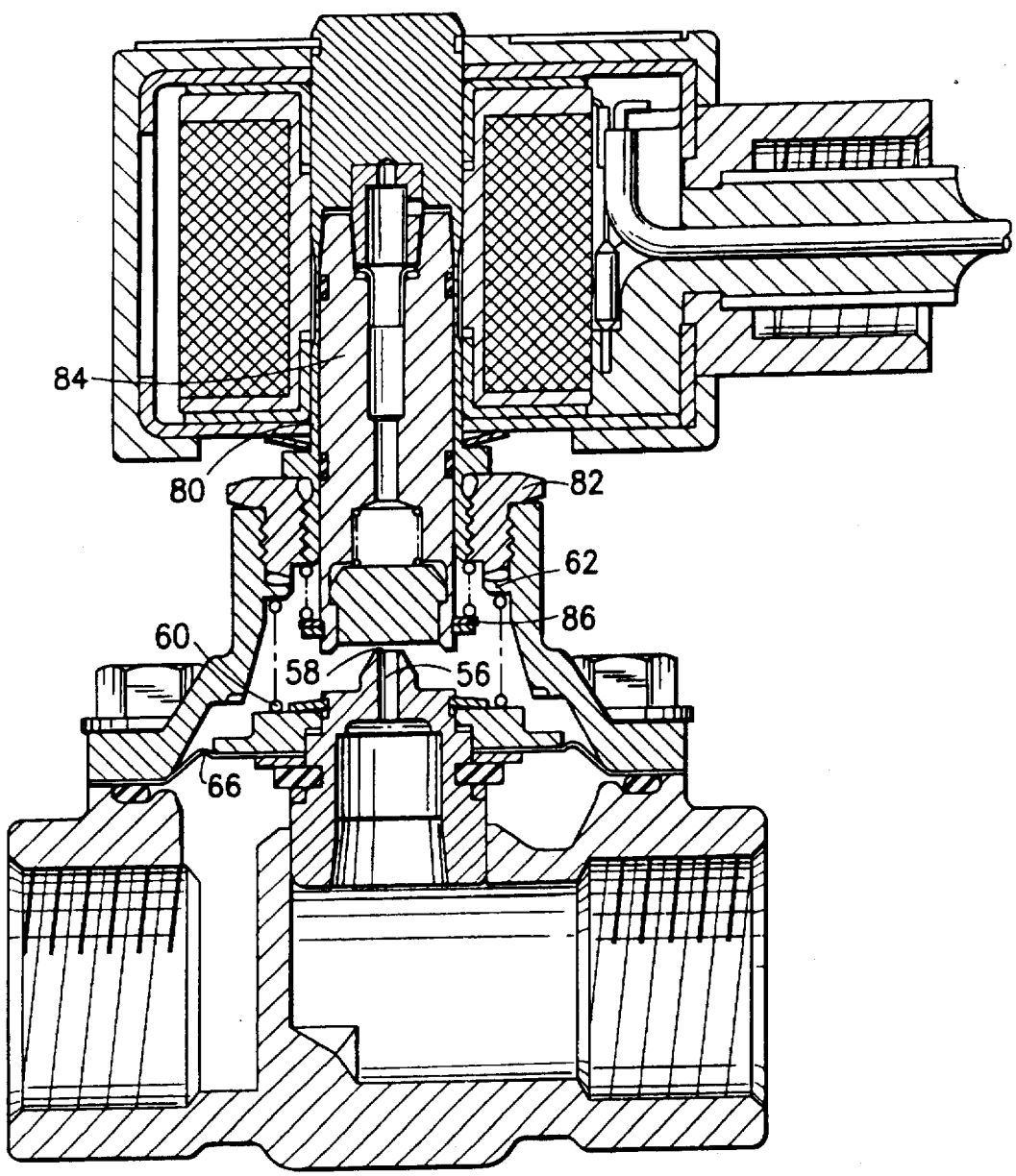
FIG. 4 is a view similar to FIG. 1, showing the solenoid energized and pilot valve open, and the main valve fully open.

The main valve unit 30 continues to rise until pilot valve seat 58 engages pilot valve sealing member 68, i.e., the pilot valve is closed. As a result, high pressure fluid cannot escape from the reservoir 64. As fluid entering the reservoir 64 builds up, the downward force on the main valve unit 30 increases until it, in combination with the downward force of the spring 60, again exceeds the upward force of the inlet fluid against the bottom of main valve unit 30. The result is downward movement of the main valve unit 30. However, as soon as the main valve unit 30 begins to move downwardly, pilot valve 68 opens, once again permitting high pressure fluid above the main valve unit 30 to escape through passageway 56 to the fluid outlet port 16. An equilibrium position (FIG. 4) is quickly established in which main valve unit 30 constantly oscillates a very short distance as pilot valve 68 is repeatedly opened and closed.

The location of the main valve unit 30 as it oscillates is determined by the position of movable armature 84 and, hence, pilot valve sealing member 68. This position also determines the spacing between main valve member 32 and main valve seat 18, and hence determines the rate of flow through the valve.

The position of movable armature 84, at any moment, is determined by the amount of solenoid current applied to solenoid coil 72. For example, if the pulse width modulation voltage as a 50% duty cycle, the current flowing through the solenoid coil 72 will be 50% of maximum. As a result, the movable armature 84 will rise though one half its maximum stroke between its position when the valve is closed (FIG. 1) and its position when the valve is fully open (FIG. 4), i.e., when its upper face engages the lower face of the plugnut 78. Consequently, the main valve unit 30 will be permitted to rise through just 50% of its maximum rise, and hence main valve unit 30 will be spaced from main valve seat 18 about ½ if the maximum spacing. Thus, approximately ½ of the rate of maximum flow through the valve will be permitted between fluid inlet port 14 and fluid outlet port 16.

If the voltage is on 75% of the time and off 25%, i.e., there is a 75% duty cycle, movable armature 84 will rise through ¾ of its maximum stroke, and as a result approximately ¾ of the rate of maximum flow through the valve will be permitted between fluid inlet port 14 and fluid outlet port 16. It will be appreciated, therefore, that the rate of flow through the main valve is proportional to the amount of current supplied to the solenoid coil 72.

Like the valve of U.S. Pat. No. 5,294,089, the valve responds most effectively when a pulsed DC source is applied to the solenoid coil 72, as compared to simply varying the amplitude of a continuous DC current. Pulsing the current imparts a dither to the movable armature 84 which permits more precise control of the position of the movable armature 84 in response to the amount of current applied to the solenoid coil 72.

It is to be appreciated that the foregoing is a description of a preferred embodiment of the invention to which variations and modifications may be made without departing from the spirit and scope of the invention. For example, the bleed passageway need not be in the diaphragm 17 but can be within the walls of the valve body. A conduit leading between the inlet port and reservoir, within or outside of the valve body will suffice and is within scope of the invention.

What is claimed is:

1. A proportional flow valve comprising:

a valve body including an inlet port, an outlet port, a fluid reservoir between said inlet port and said outlet port, and a main valve seat mounted in said body and having an inlet side exposed to said reservoir and an outlet side exposed to said outlet port, a main valve unit comprising flexible diaphragm means operatively connected to said body to separate said inlet port and said reservoir while permitting movement of said main valve unit into and out of engagement with the main valve seat to close and open the valve, said diaphragm means having one side exposed to said inlet port and another side exposed to said reservoir, said main valve unit further having a pilot passageway extending between said reservoir and said outlet port, bleed means operatively connected between said inlet port and reservoir for enabling fluid to pass therebetween, the area of the main valve unit exposed to the reservoir being greater than the area of the main valve unit exposed to the inlet port so that when the reservoir is pressurized as a result of fluid flow through said bleed means, a net force results urging the main valve member against the main valve seat to close the valve, a pilot valve sealing member located in the path of movement of the pilot passageway for selectively enabling the flow of fluid from the reservoir through the pilot passageway for depressurizing the reservoir to cause a net force urging the main valve unit away from the main valve seat, and a solenoid actuator for positioning the pilot valve sealing member to determine the spacing of the main valve unit from the main valve seat when the pilot passageway is closed, said body permitting unobstructed movement of said main valve unit between the position in engagement the main valve seat and a position in engagement with the pilot valve sealing member at each position along the stroke of the solenoid actuator, the position of the pilot valve sealing member and hence the spacing of the main valve unit from the main valve seat being proportional to the amount of current applied to the actuator.

2. A valve according to claim 1 wherein said bleed means comprises a portion of said diaphragm having an aperture therein.

3. A valve according to claim 2 wherein said aperture has an area less than the smallest cross sectional area of the pilot passageway whereby when said pilot valve sealing member is in disengagement with said pilot valve seat, fluid can pass from said reservoir to said outlet port faster than from said inlet port to said reservoir.

4. A valve according to claim 3 wherein the end of the pilot passageway closest to the reservoir terminates in a pilot valve seat cooperable with the pilot valve sealing member.

5. A valve according to claim 3 wherein the pilot valve sealing member is disposed within the reservoir.

6. A valve according to claim 1 wherein the main valve unit further comprises a main valve member having a plurality of concentrically disposed axially directed spaced vanes guided within said outlet port for reciprocation therein between a closed position whereat the main valve orifice is sealed by the main valve unit and the entire area between the vanes is within the outlet port, and an open position whereat at least a portion of the area between the vanes is exposed to the inlet port for fluid flow from the inlet port to the outlet port.

7. A valve according to claim 6 wherein the solenoid actuator comprises a movable armature on which the pilot valve sealing member is mounted whereby the area of space between the vanes that is exposed to the inlet port is determined by the position of the movable armature for controlling the degree of fluid flow from the inlet port to the outlet port.

* * * * *

UNITED STATES PATENT AND TRADEMARK OFFICE
CERTIFICATE OF CORRECTION

PATENT NO. : 5,676,342

DATED : October 14, 1997

INVENTOR(S) : Otto et al.

It is certified that error appears in the above-identified patent and that said Letters Patent are hereby corrected as shown below:

At col. 1, line 12, after "linear", change "matter" to --manner--;

At col. 1, line 37, after "be", change "fitting" to --fitted--;

At col. 3, line 25, after "notched to", change "received" to --receive--;

At col. 4, line 18, after "wire", change "would" to --wound--;

At col. 5, line 34, after "voltage", change "as" to --has--;

At col. 5, line 36, after "rise", change "though" to --through--;

At col. 5, line 43, after "1/2" (first occurrence), change "if" to --of--;

UNITED STATES PATENT AND TRADEMARK OFFICE
CERTIFICATE OF CORRECTION

PATENT NO. : 5,676,342
DATED : October 14, 1997
INVENTOR(S) : Otto, et. al.

It is certified that error appears in the above-identified patent and that said Letters Patent is hereby corrected as shown below:

At col. 6, line 9, after "exposed to said", change "reservoir" to --inlet port--.

Signed and Sealed this

Tenth Day of February, 1998

Attest:

BRUCE LEHMAN

Attesting Officer

Commissioner of Patents and Trademarks